United States Patent
Lukkaroinen et al.

(10) Patent No.: US 7,478,430 B2
(45) Date of Patent: *Jan. 13, 2009

(54) SECURE USER ACTION REQUEST INDICATOR

(75) Inventors: Mikko Lukkaroinen, Oulu (FI); Virve Inget, Oulu (FI)

(73) Assignee: Nokia Corporation, Espoo, FL (US)

( * ) Notice: Subject to any disclaimer, the term of this patent is extended or adjusted under 35 U.S.C. 154(b) by 223 days.

This patent is subject to a terminal disclaimer.

(21) Appl. No.: 11/533,541

(22) Filed: Sep. 20, 2006

(65) Prior Publication Data

US 2007/0050847 A1 Mar. 1, 2007

Related U.S. Application Data

(63) Continuation of application No. 09/525,806, filed on Mar. 15, 2000, now Pat. No. 7,124,439.

(51) Int. Cl.
G06F 21/24 (2006.01)

(52) U.S. Cl. ....................................... 726/23

(58) Field of Classification Search .................... 726/23
See application file for complete search history.

(56) References Cited

U.S. PATENT DOCUMENTS

| | | | |
|---|---|---|---|
| 6,065,120 A | 5/2000 | Laurser et al. |
| 6,334,056 B1 | 12/2001 | Holmes et al. |
| 6,366,912 B1 | 4/2002 | Wallent et al. |
| 6,405,037 B1 | 6/2002 | Rossmann |
| 6,647,260 B2 | 11/2003 | Dusse et al. |

*Primary Examiner*—Andrew L Nalven
(74) *Attorney, Agent, or Firm*—Perman & Green, LLP

(57) ABSTRACT

A mobile communications device is adapted to use applications resident on a remote network server. The display of the mobile device is divided into static and dynamic display zones. Inquiries originating externally from the mobile device are identified and restrictively routed only to the dynamic display. Internally generated inquiries trigger a indicator symbol within the static display. In this manner bogus requests for confidential identifiers may be avoided.

12 Claims, 3 Drawing Sheets

SECURE USER ACTION REQUEST INDICATOR

CROSS-REFERENCE TO RELATED APPLICATION(S)

This application is a continuation of, claims priority from and the benefit of U.S. application Ser. No. 09/525,806 filed 15 Mar. 2000, now U.S. Pat. No. 7,124,439, the disclosure of which is incorporated by reference herein in its entirety.

BACKGROUND OF THE INVENTION

Communications devices, such as mobile phones, pagers and the like, are being packed with more and more features. In the past such mobile equipment has been a closed environment namely, all of the features use software within the mobile equipment or SIM. With the advent of new technologies, which use wireless communications protocols, such as Wireless Application Protocol (WAP) or comparable protocols, additional applications are accessible by the mobile device, from network servers. As a result a new security threat arises for mobile equipment. Mobile equipment will soon be subject to queries designed to extract confidential security information from the user, such as a PIN or other identifier. It is therefore necessary to devise a reliable system in which requests for information originating from remote "hostile" sources can be readily identified, ignored It is a purpose of this invention to provide a system for identifying remote inquiries which may precipitate a breach of security in the use of mobile equipment such as a mobile telephone, pager or other similar communications device.

SUMMARY OF THE INVENTION stored on a network server remote from the mobile device. To reduce the risk of receiving bogus requests for confidential identifiers, a system is designed to identify externally generated inquiries. To this end, means are provided to segregate the display of remote information requests. The mobile device is equipped with a display that is divided into dynamic and static display zones. Externally generated inquiries can be written only to the dynamic zone. Internally generated inquiries will trigger an indicator in the static zone to advise the user of the authenticity of the inquiry. As a result hostile requests for information may be immediately recognized and ignored.

DESCRIPTION OF THE DRAWING

The invention is described in more detail below with reference to the attached drawing in which.

DESCRIPTION OF THE PREFERRED EMBODIMENT

Figure 1:
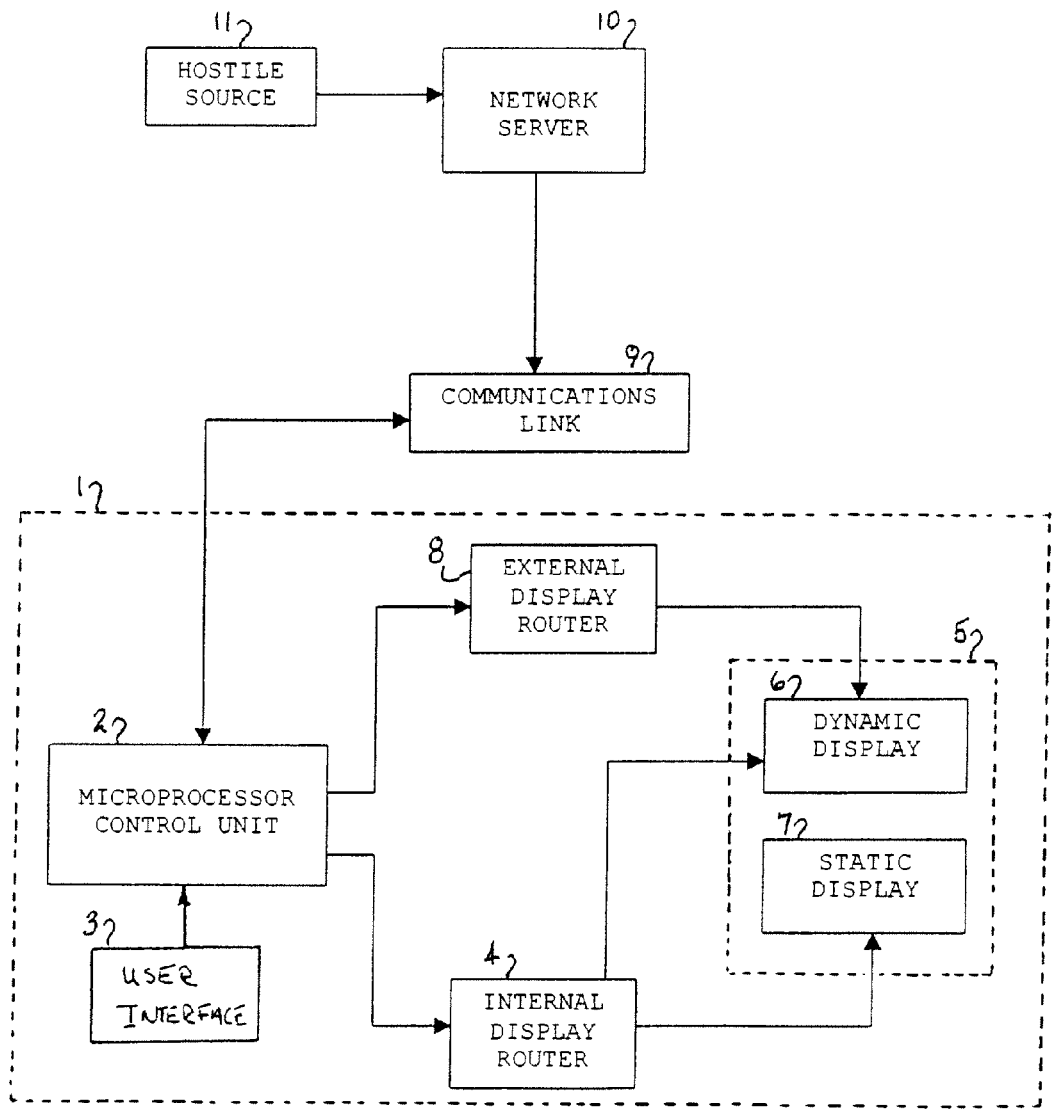
FIG. 1 is a block diagram of a communication system utilizing the subject invention.

The basic components of the communications system of this invention are shown in the block diagram of FIG. 1. A mobile device 1 is connected through a communications link 9 to a network server 10. In this instance, the network server 10 does more than facilitate communications traffic, it also provides interactive applications such as banking, E-mail, investing and other features.

Mobile device 1 includes a microprocessor control unit (MCU) 2 that is accessed by the user via a user interface 3, such as a keyboard. Display 5 communicates information from the MCU 2 to the user. The MCU 2 contains the required software or firmware to execute the functions on mobile device 2 required to operate the applications resident in the network server 10. Many of the applications will require the use of security identifiers, such as PINS and other confidential codes to be access the personal application files of the user.

In the early days of networked computers, there was a proliferation of bogus log-in procedures that generated inquiries to the personal computer for confidential information. If the information was supplied, it was stolen and used for criminal or other activities not authorized by the user. The risk of such security breaches is now becoming a problem for the user of mobile devices, especially those equipped to take advantage of the communications protocols such as WAP. Such protocols represent standard operating procedures for interactive transmittal of data used to execute an assortment of transactions. Although many of these transactions are secure because of the required digital signatures, such as PIN codes, it is essential that the code be maintained confidential. Bogus inquiries are a significant threat to the usefulness of these applications.

The mobile device 1 of this invention is equipped with a display 5, which is divided into two discrete zones, a static display zone 7 and a dynamic display zone 6. An internal display router 4 directs internally generated inquiries and information to either the static or dynamic displays.

Figure 3A:
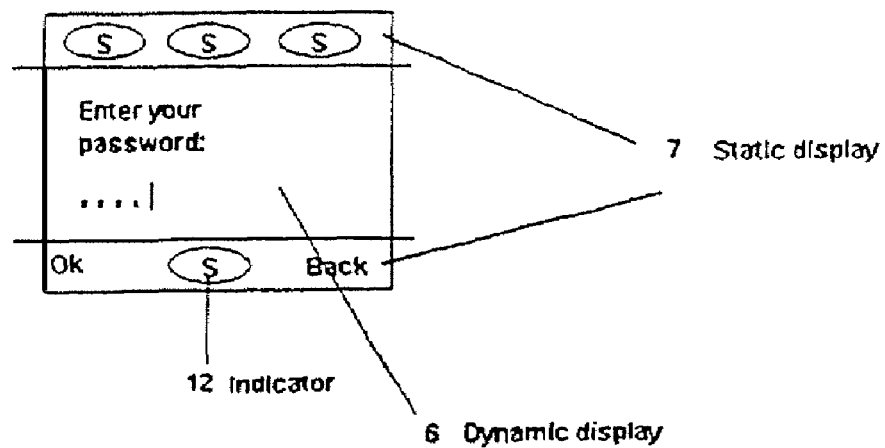
FIGS. 3a and 3b illustrate embodiments of the segregated screen of this invention.
Figure 3B:
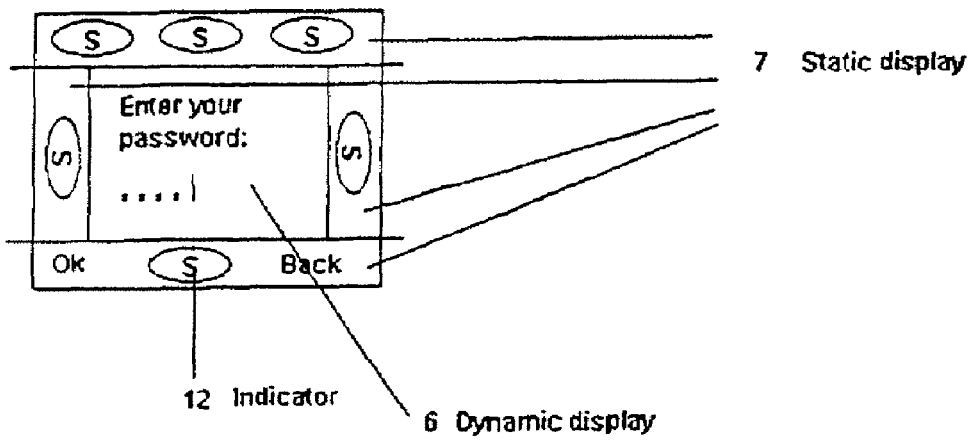

As shown in FIGS. 3a and 3b, the static display 7 may present menu icons, tool symbols, status indications, such as battery level, and other administrative references. The dynamic display 6 is for displaying interactive information relative to executing the activities of an application in progress. Information generated within the mobile device, may be displayed on either the static or dynamic displays.

Information transmitted to the mobile device 1 from, for example a hostile source 11 through the network server 10, will utilize browser protocols and be readily identifiable. This information is directed to the dynamic display 6 by a external display router 8. In this manner, information from the network server 10 is isolated from the internally generated information of the mobile device 1.

To inform the user of the authenticity of inquiries for identifier codes, an indicator symbol 12, for example a blinking icon, will be displayed in the static display 7, as shown in FIGS. 3a and 3b. When displayed, this symbol will indicate to the user that the request is internally generated. Since the MCU identifies the external inquiry and this information is only routed to the dynamic display 6, there is a reliable indication that a PIN number can be transmitted without appreciable risk of abuse.

Figure 2:
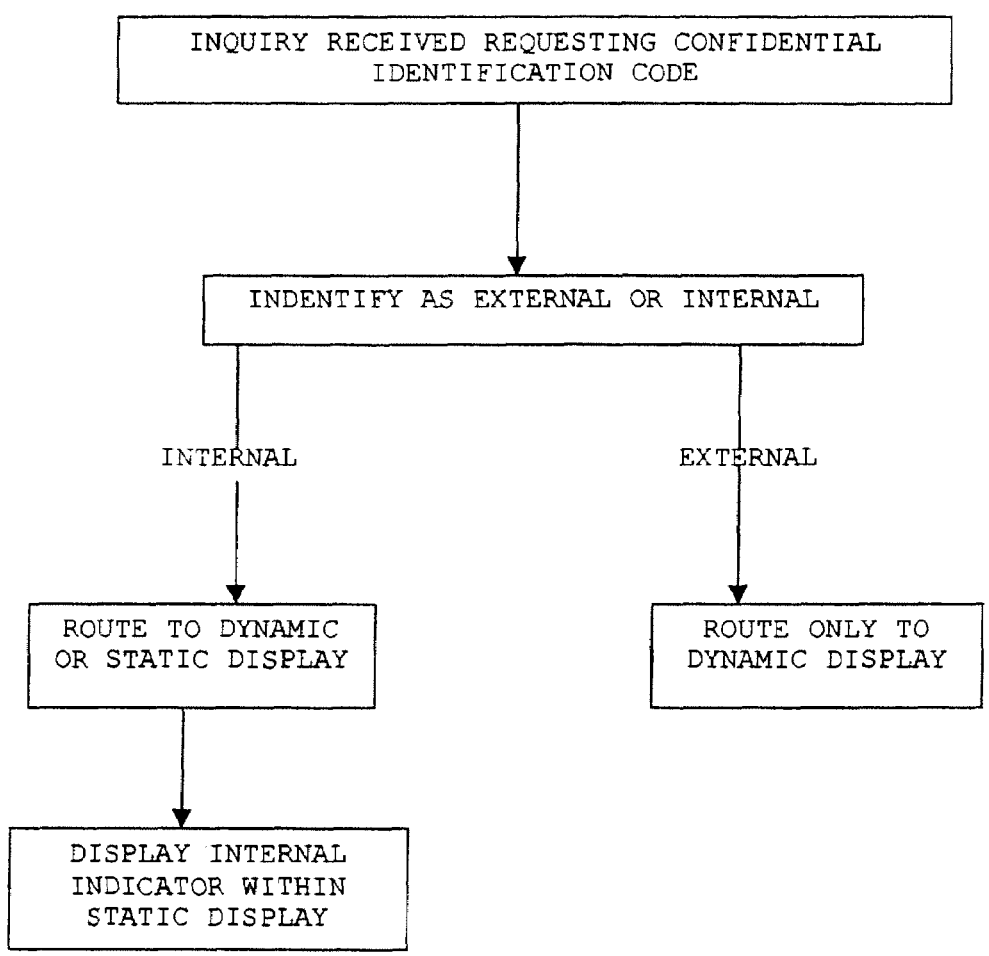
FIG. 2 is a information flow diagram of the method of this invention.

As shown in FIG. 2, in operation, if a bogus log-in procedure from hostile source 11 is transmitted through the network server 10, when it is received, it is identified by the MCU and routed only to dynamic display 6. The externally generated inquiry may be written only to the dynamic display 6. When an inquiry is generated by the execution of internal software, an indication is prominently displayed in the static display 7. When responding to the inquiry displayed in dynamic display 6, the user will be warned not to respond unless the internal indicator is displayed.

In this manner transmittal of confidential identification codes, restricted and the risk of unauthorized interception and use of PIN codes and the like may be significantly reduced.

We claim as our invention:

1. A mobile communications device comprising:
   a communications link adapted to allow a user to communicate interactively with a remote network server and receive inquiries for confidential identity codes;
   a control processor within said mobile communications device for operating said device, said processor adapted to identify said inquiries as externally generated or internally generated;
   a display within said mobile device for presenting information to the user, said display divided into first and second discrete display zones; and
   a display router within said mobile device constructed to send externally generated information only to said first display zone.

2. The mobile communications device according to claim 1, wherein said control processor generates an indication symbol in said second display zone when the inquiry is internally generated.

3. The mobile communications device according to claim 1, wherein the first and second display zones are dynamic and static displays respectively.

4. A method for receiving inquiries for confidential identity codes received by a mobile communications device comprising:
   internally, within the mobile communications device, identifying said inquiries as externally generated or internally generated;
   internally, within the mobile communications device, dividing said display into first and second discrete display zones;
   internally, within the mobile communications device, routing externally generated inquiries only to said first display zone.

5. The method according to claim 4 further comprising internally, within the mobile communications device, generating an indication symbol in said second display zone when the inquiry is internally generated.

6. The method according to claim 4, wherein the first and second display zones are dynamic and static displays respectively.

7. A system for providing interactive services comprising:
   a network server in communication with a mobile communications device;
   a mobile communications device coupled to said network server through a communication link for receiving interactive services, including inquiries for confidential identity codes, said mobile communication device further comprising:
   a control processor within said mobile communications device for operating said device, said processor adapted to identify said inquiries as externally generated or internally generated;
   a display within said mobile device for presenting information to the user, said display divided into first and second discrete display zones; and
   a display router, within said mobile device, constructed to send externally generated information only to said first display zone.

8. The system according to claim 7 wherein said control processor generates an indication symbol in said second display zone when the inquiry is internally generated.

9. A program product for execution by a control processor of a mobile communications device for receiving inquiries for confidential identity codes comprising:
   processor readable program code for identifying said inquiries as externally generated or internally generated;
   processor readable program code for dividing said display into first and second discrete display zones; and
   processor readable program code for routing externally generated inquiries only to said first display zone.

10. The program product according to claim 9 further comprising a processor readable program code for generating an indication symbol in said second display zone when the inquiry is internally generated.

11. A user interface for a mobile communications device comprising:
    a display within said mobile device for presenting information to the user, said display divided into first and second discrete display zones; and
    a display router within said mobile device constructed to send externally generated information only to said first display zone.

12. The user interface according to claim 11 further comprising a control processor adapted to generate an indication symbol in said second display zone when the inquiry is internally generated.

* * * * *